Nov. 24, 1925.
A. E. PENFOLD
1,562,912
GOLF BALL AND METHOD OF MAKING THE SAME
Filed Nov. 4, 1922
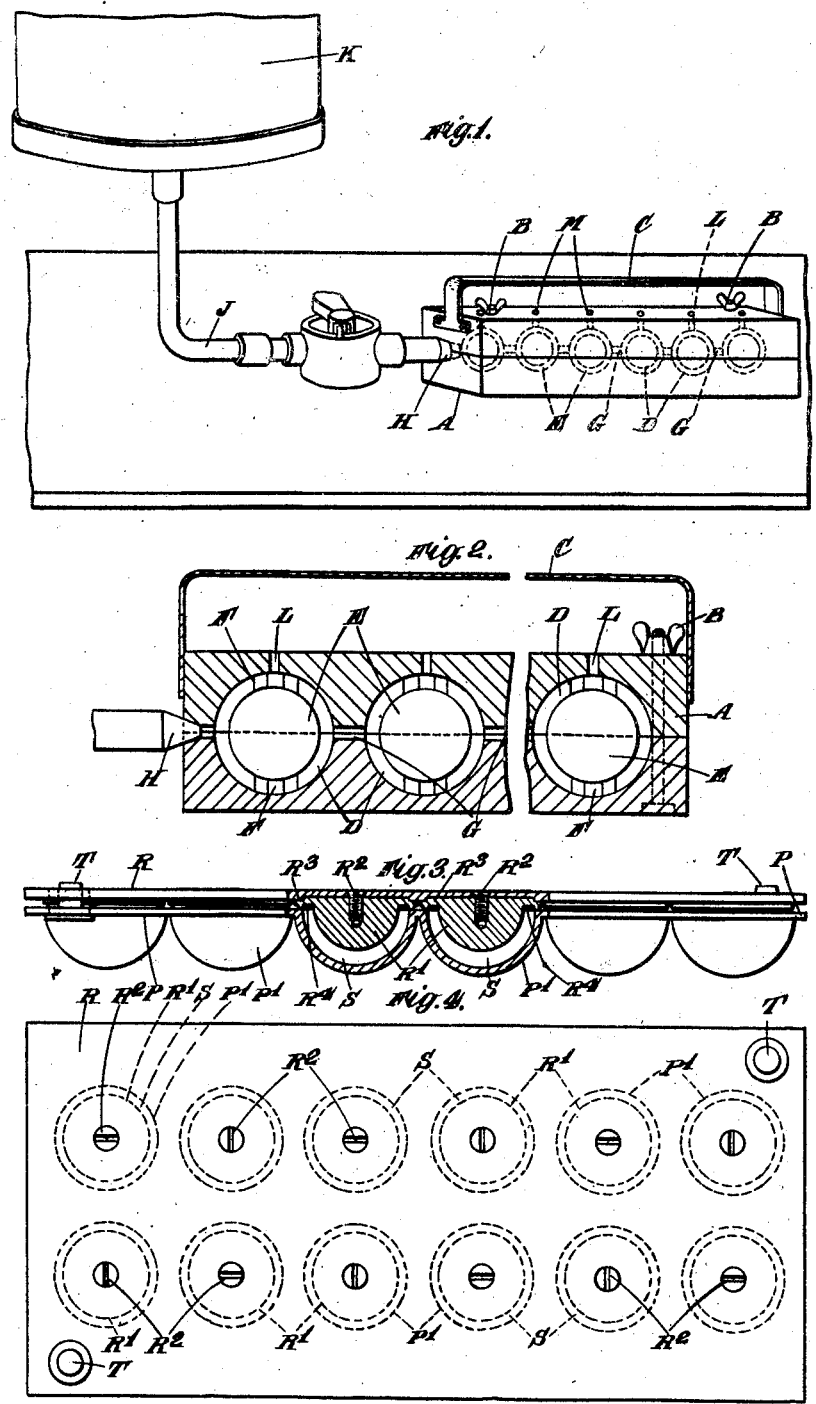

Patented Nov. 24, 1925.

1,562,912

UNITED STATES PATENT OFFICE.

ALBERT ERNEST PENFOLD, OF BIRMINGHAM, ENGLAND, ASSIGNOR TO THE DUNLOP RUBBER COMPANY, LIMITED, OF REGENTS PARK, LONDON, ENGLAND, A BRITISH COMPANY.

GOLF BALL AND METHOD OF MAKING THE SAME.

Application filed November 4, 1922. Serial No. 599,067.

*To all whom it may concern:*

Be it known that I, ALBERT ERNEST PENFOLD, a subject of the King of Great Britain, residing at Manor Mills, Salford Street, Aston, Birmingham, in the county of Warwick, England, have invented certain new and useful Improvements in or Relating to Golf Balls and Methods of Making the Same, of which the following is a specification.

This invention relates to the manufacture of golf balls and has more particular reference to the manufacture of the outer covers or shells of gutta-percha or the like and to the application of such outer covers or shells to golf ball cores which are wrapped or wound with rubber tapes or strips under tension.

According to this invention the outer cover or shell is produced from a solution of gutta-percha and or balata with or without the addition of india-rubber (the solution hereinafter being referred to as gutta-percha solution) and the main feature of the invention consists in producing or forming the outer cover or shell for a rubber wound core from the gutta-percha solution in such manner that the solvent in the solution is prevented from acting on the rubber windings of the core so as to avoid the likelihood of the said rubber windings being snapped or weakened or otherwise detrimentally affected by the solvent.

The main advantage of the use of gutta-percha solution is that it avoids the mechanical treatment or working of the gutta-percha such as is involved in the usual method of producing hemispherical cups from plastic gutta-percha which are placed on the core or in the method in which the gutta-percha is calendered and formed into strips which are wound round the core. Thus by using gutta-percha solution and eliminating all mechanical treatment or working of the gutta-percha the "nerve" of the original gutta-percha is retained and by ensuring that the solvent in the solution does not act on the rubber windings of the core according to the main feature of this invention, the resilience of the core is not impaired and the core is not in any way detrimentally affected so that we are able to produce an improved golf ball.

In one method of carrying out this invention, a rubber wound core is protected against the action of the solvent in the gutta-percha solution by applying to the core any substance or material which serves as a protective covering or layer, so that the protected rubber wound core may be dipped or immersed in the gutta-percha solution or may have the gutta-percha solution applied thereto in any other manner to form a covering of the desired thickness without the likelihood of the rubber windings of the core being snapped by the solvent in the gutta-percha solution forming the said covering. The covering so formed is moulded in any appropriate manner.

The protective material or substance, which is applied to the core, may be a thin winding or layer of gutta-percha.

One convenient method of protecting the core is to produce from the gutta-percha solution hemispherical cups which after evaporation of the solvent may be placed round the core to completely enclose it and thus protect the rubber windings, whereupon the protected core may have the solution applied thereto to the desired thickness.

As a development of the feature of providing hemispherical protecting cups, as aforesaid, I may according to a further feature of the invention produce from gutta-percha solution, hemispherical cups of such thickness that after evaporation of the solvent, they may be applied to the rubber wound core so as to form the outer cover or shell which is finally moulded. It will thus be understood that the formation of the hemispherical cups from a gutta-percha solution and the application of the same to the core after evaporation of the solvent enables the core to be provided with a cover formed from gutta-percha solution without detrimentally affecting the core or impairing its resilience whilst the outer cover so formed possesses the nerve of the original gutta-percha.

The gutta-percha solution is generally maintained in a heated condition and after being applied to the core or after being formed into the hemispherical cups, it may be chilled for the purpose of precipitating the gutta-percha onto the core. I may provide devices in the form of containers, moulds, or the like, in which the solution may be cast on or otherwise caused to be applied to a core (which may be the protected golf ball core or a former in the case of forming hemispherical cups from the solution) which devices may be chilled for example by ice water, cold brine or in any other suitable manner for enabling the gutta-percha solution to be subjected to a sudden and substantial reduction in temperature in order to expedite precipitation of the gutta-percha.

In order that the invention may be clearly understood and readily carried into effect various methods in which the outer cover or shell is formed by applying the gutta percha solution to the golf ball core will first be described and later the methods in which hemispherical cups or shells are made from the gutta percha solution ready for application to the golf ball cores will be described, certain of the various methods being described with reference to the accompanying drawings in which:—

Figure 1 is a diagrammatic view showing one construction of mould for enabling the gutta percha solution to be applied to the whole of the golf ball core.

Figure 2 is a vertical longitudinal section taken through the middle of the mould shown in Figure 1.

Figures 3 and 4 are respectively a side view (partly in section) and a plan of one construction of mould in which the hemispherical cups are formed from the gutta percha solution.

In forming the outer cover or shell by the dipping or immersion method, the gutta-percha solution which is prepared in any suitable manner for example by dissolving gutta-percha in a solvent, such as petroleum spirit, at a temperature of about 110° F. The solution is maintained in a heated condition in a tank or receptacle and the rubber wound core protected in the manner aforesaid is completely dipped or immersed in the warm solution so that when the core is removed it is entirely covered with a coating of the solution. The said core may be dipped several times to produce the desired thickness of gutta percha on the core, but generally two dippings will be sufficient; after each dipping the solution covered core is allowed to stand so that the solution can dry and cool. During the drying of the solution after the second dipping, the core is preferably supported in a position diametrically opposite to that which it occupied when drying after the first dipping. The protection of the rubber wound core may be effected by winding or wrapping a gutta-percha strip around the core or by means of gutta-percha cups covering the whole of the rubber wound core, the object of this protective covering of gutta percha being to prevent the rubber tape or the like wound on the core from being snapped by the solvent in the gutta percha solution which is applied to the core to form the outer cover or shell as aforesaid. The said gutta percha cups may be formed by dipping a suitable shape or former in gutta percha solution and after evaporation of the solvent from the solidified material on the former the cups are removed ready to be placed on the rubber wound core prior to the latter being covered with the gutta percha solution which is to form the outer cover.

In applying the outer-cover or shell to the core according to another method I employ trays or plates having semispherical depressions each of which is supplied with a quantity of warm gutta percha solution. The cores after having been protected as aforesaid are placed in these depressions so that half of each core may be covered with the solution and in order to ensure uniform covering, small locating pins are provided in each depression to retain the core out of contact with the bottom or surrounding wall of the depression. The tray is then subjected to a sudden chill, for example by placing it in ice water which causes the temperature of the solution to be suddenly and substantially reduced and in the space of about five to ten minutes the gutta-percha is precipitated or solidified on to the lower half of the core. The cores half covered with the gutta percha are removed from the depressions and then placed in the reverse positions in warm gutta-percha solution contained in similar depressions in another tray or plate so that the uncovered halves of the cores are immersed in warm solution which is then chilled in the manner aforesaid to cause the gutta-percha to be precipitated and solidified on the cores thus completely covering the whole of each core. If desired the solution may be caused to flow into the depressions from a suitable source of supply so as to surround the parts of the cores supported in the depressions. Instead of covering the core in two operations the whole of the core may be covered with solution in one operation by causing the solution to flow around the core in an enclosing box or mould. An example of the means for carrying out this method is illustrated in Figures 1 and 2 of the accompanying drawings; A indicates a mould or box generally which as shown comprises upper and lower parts adapted to be detachably secured together by means of bolts and wing nuts B, the upper part of the box having a handle C for enabling the upper part to be readily moved and also the complete box to be readily shifted as required. The two parts are provided with registering semispherical depressions which when the two parts are closed form spaces D in which the golf ball cores E are contained. The cores are placed in the lower depressions and supported on small locating pins F and similar locating pins in the depressions in the upper part of the box serve to retain the cores against movement when the upper part is placed on and secured to the lower part. The several spaces E communicate by means of connecting passages G, one end of the box being completely closed, whilst the other end is formed with an opening to receive a nozzle H on a valve controlled pipe J leading from a tank K containing the solution which is maintained in a heated condition for example by a hot water jacket or other suitable means. The nozzle H and the opening in the box in which it fits may be tapered so as to provide a simple "push" connection between the pipe J and the box. If desired a readily operated screw connection may be provided instead of the push connection. Vent holes L connected with the spaces D are provided in the upper part of the box and may be closed when required for example by plugs M as indicated in Figure 1. The vent holes are open at the commencement of the operation of applying the solution to the cores, and after a good joint has been made between the box A and the nozzle H, the valve on the pipe J is operated to allow the warm solution to flow from the tank into the space C surrounding the first core whereupon it flows through the connecting passages G in to the succeeding spaces C. The flow of the solution can be observed through the vent holes in succession and as the solution is seen in each vent hole the latter is closed by inserting a plug to prevent the solution from flowing out of that vent hole. After the last vent hole has been plugged the valve is closed to stop the flow and the box is disconnected from the nozzle on the supply pipe J and placed into a tank or trough containing ice water or the like which rapidly chills the solution surrounding the cores in the box and causes guttapercha to be precipitated or solidified on the cores. After the chilling operation the box is removed from the "ice bath" and the two parts are separated whereupon the cores covered with the gutta percha are removed and allowed to stand so that the solvent in the solution may completely evaporate. If desired the cores may be provided with a protective covering of gutta percha prior to the application of the solution in the methods in which the applied solution is chilled as hereinbefore described.

After the cores have been covered with the gutta percha by any of the methods above described the balls so formed are moulded in any usual or suitable manner.

By means of this invention the application of the outer cover or shell to the core can be effected very rapidly and with a minimum of waste and the several processes of preparing the gutta percha as required for the usual methods are obviated and substituted by the simple process of preparing a gutta percha solution. A further advantage is that the outer cover or shell is rendered very tough and durable as the gutta percha is not impaired by any mechanical treatment. Further the outer cover or shell can be produced without a seam or joint and the finished ball possesses very satisfactory playing qualities.

There will now be described various methods of forming gutta percha cups or covers from the gutta percha solution which cups may be subsequently applied to or fitted on a golf ball core. According to one of these methods I provide a tray D having a number of hemispherical depressions $P^1$, which tray forms the lower part of a two part mould, the other part of which is constituted by a plate R having a number of hemispherical projections $R^1$ which are adapted to fit in the said depressions in the lower mould part or tray so that cavities or moulding spaces S are formed between the inner surface of the depressions $P^1$ and the outer surface of the hemispherical projections $R^1$. By supplying the said cavities S with the gutta percha solution and allowing the latter to solidify, the hemispherical gutta percha cups are formed. The aforesaid projections $R^1$ may be attached to the plate by screws $R^2$ or other suitable means and they are formed with flanges $R^3$ which are suitably shaped to bear on the portions of the tray around the depressions formed therein. These flanges $R^3$ may be provided with annular grooves $R^4$ which forms a slight continuation of the moulding spaces or cavities S between the depressions and the projections. The plate carrying the projections may be retained in the correct position on the tray by suitable locating means which for example may be in the form of pins T fixed on the tray and adapted to project into holes formed in the plate carrying the projections; the said pins may be coned or tapered at their outer ends to permit of the plate being readily placed in position, whilst the lower parts of the pins are cylindrical and make a close fit in the holes in the plate so that the projections on the plate are immovably maintained in the desired positions in the depressions in the tray. Prior to the fitting of the plate R on the tray P warm gutta percha solution may be supplied to the depressions $R^1$ whereupon the said plate is placed on the tray so that the projections $R^1$ dip into the solution in the depression and cause the solution to fill moulding spaces or cavities S between the said depressions and projections with the result that upon the solidification of the solution in the said cavities S the gutta percha cups are produced. The solidification of the gutta percha solution may be effected by subjecting the tray or complete mould to a sudden chill, for example by contact with ice water or cold brine as hereinbefore described. The gutta percha cups formed in the manner aforesaid are ready to be applied to the golf ball cores and the application of the cups to the cores may be effected in any suitable or usual manner. In some cases the solution may be supplied to hemispherical moulding spaces or cavities, instead of supplying the solution to the depressions and then placing projections therein. For example, the various moulding spaces or cavities may be suitably connected by channels or passages and gutta percha solution may be poured or allowed to flow from a container into an opening communicating with the said connected spaces or cavities so that the solution flows in to and fills the said spaces or cavities. If desired the cups may be produced by dipping a hemispherical former into gutta percha solution contained in a tank so that when withdrawn it will be covered with a layer of the solution which is allowed to solidify thereon. The former may be repeatedly dipped in the solution to obtain the desired thickness of gutta percha and the solution may be allowed to solidify on the former after each dipping.

What I claim and desire to secure by Letters Patent of the United States is:—

1. The improvement in the method of forming the outer cover or shell of a golf ball having a rubber wound core, comprising shaping a solution of gutta percha to form a covering for the core, and preventing the solvent in such solution from acting on the rubber windings of the core.

2. The improvement in the method of forming the outer cover or shell of a golf ball having a rubber wound core, comprising applying a protective substance to the rubber wound core and afterwards applying the gutta-percha solution to the protected core, the said protective substance serving to protect the rubber windings of the core from the action of the solvent in the applied solution.

3. The improvements in the method of forming the outer cover or shell of a golf ball having a rubber wound core, consisting in shaping a solution of gutta-percha to form a covering for each half of the core, preventing the solvent in the solution from acting on the windings and molding the applied cover.

4. The improvement in the method of forming the outer cover or shell of a golf ball having a rubber wound core, consisting in protecting the rubber windings on the core applying gutta-percha solution to the protected core in two successive operations so as to cover each half of the core separately, and thereafter molding the applied covering on the core.

5. A golf ball having a rubber wound core and an outer cover or shell formed from a gutta-percha solution, of which the solvent is prevented from acting on the rubber windings of the core.

6. A golf ball having a rubber wound core, an outer cover or shell formed from a gutta-percha solution, and a protective medium between the core and the outer cover.

ALBERT ERNEST PENFOLD.